United States Patent [19]

Ihde, Jr.

[11] 3,970,620

[45] July 20, 1976

[54] POLYVINYLCHLORIDE COMPOSITIONS FOR FROTHING

[75] Inventor: Frederick J. Ihde, Jr., Mountain Lakes, N.J.

[73] Assignee: Diamond Shamrock Corporation, Cleveland, Ohio

[22] Filed: June 24, 1975

[21] Appl. No.: 589,758

Related U.S. Application Data

[63] Continuation of Ser. No. 437,054, Jan. 28, 1974, abandoned.

[52] U.S. Cl. ............................ 260/2.5 P; 260/2.5 S; 260/23 XA; 260/28.5 D; 260/30.4 R; 260/30.6 SB; 260/31.4 R; 260/31.8 S; 260/31.8 R; 260/31.8 M; 260/31.8 B; 260/32.6 R; 260/45.75 V; 260/46.3 G; 260/448.2 E; 260/827
[51] Int. Cl.² ........................................ C08V 9/30
[58] Field of Search ................................. 260/2.5 P

[56] References Cited
UNITED STATES PATENTS

| | | | |
|---|---|---|---|
| 2,861,963 | 11/1958 | Butsch | 260/2.5 P |
| 3,061,558 | 10/1962 | Alter | 260/2.5 P |
| 3,674,547 | 7/1972 | Noone | 260/2.5 P |
| 3,705,669 | 12/1972 | Cox et al. | 260/2.5 P |
| 3,730,931 | 5/1973 | Simoneau et al. | 260/2.5 P |
| 3,790,510 | 2/1974 | Flannigan | 260/2.5 P |

*Primary Examiner*—Morton Foelak
*Attorney, Agent, or Firm*—Neal T. Levin; Leslie G. Nunn

[57] ABSTRACT

Polyvinylchloride foam compositions are prepared by frothing. To prepare the compositions for frothing, the silicone surfactant frothing agents present are extended with oleophilic frothing aids which do not significantly detract from the hydrophobic and flame retardant properties of the foam. Further, the frothing aids may be used to control froth viscosity. From about 5.0 phr to about 10.0 phr of a frothing aid is added to about 2.0 phr to about 4.0 phr of the frothing agent present in the composition. Simple and complex organic phosphate and phosphite esters; organic nirogen compounds such as amines, aminoamides, alkanolamides, imidazolines, quaternaries, and nirogen-sulfur compounds; simple and complex organic borate esters such as 2-ethyl-hexyl borate, trihexylene glycol biborate, and tricresyl borate are useful as frothing aids.

14 Claims, No Drawings

3,970,620

POLYVINYLCHLORIDE COMPOSITIONS FOR FROTHING

This is a continuation of application Ser. No. 437,054, filed Jan. 28, 1974, now abandoned.

BACKGROUND OF THE INVENTION

1. Field of the Invention

This invention relates to polyvinylchloride homopolymer and copolymer foam compositions prepared by frothing. These compositions contain silicone surfactant frothing agents and oleophilic frothing aids.

2. Description of the Prior Art

Techniques for the preparation of polyvinylchloride homopolymer and copolymer foam compositions from plastisols are well known in the polymer art. Also, the literature on polyvinylchloride and acetate modified polyvinylchloride resin plastisol preparation is quite extensive. Reference may be made to the following publications:

Boehm and Dietz, "Vinyl Froth Foams Via the Oakes Continuous Mixer", Diamond Shamrock Chemical Company Technical Service Information Report No. 3-71, Apr. 30, 1971.

Boehm and Dietz, "The 'Ulok' PVC Carpet Backing System", Diamond Shamrock Chemical Company Technical Service Information Report No. 4-71, May 5, 1971.

Simoneau, "Silicone Surfactants in Mechanically Frothed Vinyl Plastisol Foams", Rubber World, p. 49, August 1970.

Renshaw and Garlick, "How to Back Carpets with PVC", SPE Journal, Vol. 28, p. 21 (1972).

Keil and Webb, "Mechanically Frothed Vinyl Plastisol Foams", Journal of Cellular Plastics, Vol. 6, No. 4, p. 3, July/August, 1970.

Polyvinylchloride (PVC) foam for use as carpet and rug backing and in other markets has certain inherent advantages over other foamed polymers. PVC foams for rug and carpet backing have high tensile and tear strengths; they are more resistant to scuffing, and they have stronger tuff-lock. Also, of significant importance, PVC foams are more fire retardant than other foam polymers.

There are three general methods for producing foam from plastisols . . . compressed gas, chemical blowing agents, and frothing (mechanical whipping). In the frothing method, the most widely used method for producing fine open cell foam, PVC foam is produced by mechanical whipping of the plastisol to incorporate air into the plastisol and then fusing the foam at a relatively low temperature of about 270° to about 290°F. About the only disadvantage of this relatively simple frothing method is the high cost of the silicone surfactant frothing agent.

Additional information on the preparation of PVC foam compositions by frothing can be found in U.S. Pat. No. 3,511,788 — Keil — issued May 12, 1970. This patent describes the preparation of froths using silicone surfactant frothing agents and the use of these foams in various applications including the coating of substrates such as rugs and carpets.

SUMMARY OF THE INVENTION

Polyvinylchloride compositions for frothing contain
1. a foamable plastisol which is a mixture of
   a. a particulate resin such as a vinyl resin homopolymer or a resinous copolymer containing a major portion of the vinyl resin and a minor portion of a copolymerizable monomer,
   b. one or more high boiling organic liquid plasticizers which is substantially a non-solvent for the particulate resin at room temperature but is capable to dissolving the particulate resin at an elevated temperature to form a single phase material which upon cooling to room temperature is a solid material,
2. from about 1 to about 5 phr of one or a mixture of silicone frothing agents, and
3. from about 5 to about 10 phr of one or a mixture of frothing aids which is a phosphate ester, phosphite ester, borate ester, organic nitrogen compound or organic nitrogen-sulfur compound.

These compositions are prepared by mixing the plastisol, frothing agent and frothing aid. The compositions are prepared from foamable polyvinylchloride homopolymer and copolymer resin plastisols. These plastisols include vinyl chloride homopolymers and copolymers thereof. The frothing agents are silicone surfactants. Suitable frothing aids include simple and complex organic phosphate esters and phosphite esters; organic nitrogen compounds such as amines, aminoamides, alkanolamides, imidazolines, quaternaries, and organic nitrogen-sulfur compounds, simple and complex organic borate esters such as 2-ethylhexyl borate, tri-hexylene glycol biborate, and tricresyl borates. These foam compositions are mechanically whipped to produce foams or froths, which are used in a variety of applications including coatings for substrates such as carpets and rugs. The frothing aids are used to control froth viscosity.

DESCRIPTION OF THE PREFERRED EMBODIMENTS

The polyvinylchloride (PVC) foam compositions disclosed in this invention are mixtures of a foamable plastisol, a frothing agent and a frothing aid. The compositions may also contain fillers, pigments and vinyl resin stabilizers. The plastisol is a dispersion of finely divided vinyl resin in a plasticizer.

Polyvinylchloride homopolymers and copolymers for plastisols are specifically designed vinyl resins for this purpose. With molecular weights in the 50,000–120,000 range, they have the particle size distribution and surface characteristics to form fluid plastisols with plasticizers. Normally they are called paste or dispersion resins.

The most commonly used copolymers contain 80 to 98% by weight polyvinylchloride and 2 to 20% by weight polyvinyl acetate.

Other useful PVC copolymers contain the indicated quantities of the following copolymerizable unsaturated monomers:

4 – 40% vinylidene chloride
5 – 20% acrylic ester such as methyl acrylate, octyl acrylate
5 – 40% vinyl ethers such as n-butyl vinyl ether, cetyl vinyl ether
5 – 20% maleic and fumaric esters such as diethyl maleate, di-2-ethylhexyl fumarate
5 – 40% acrylonitrile
3 – 8% ethylene
3 – 15% propylene The vinyl resin may be selected from one or more of the following groups:
1. PVC homopolymer dispersion grade resins 2. PVC-PVA copolymer dispersion grade resins
3. PVC homopolymer extender grade resins
4. PVC-PVA copolymer extender grade resins.

Both PVC homopolymer and PVC-PVA copolymer dispersion grade resins can be used in PVC compositions for foam carpet backings. PVC-PVA copolymer dispersion grade resins are often used in carpet backings because these resins produce foams which fuse at lower temperatures and have better tensile strengths and percent elongations than foams produced from PVC homopolymer dispersion grade resins.

Often PVC homopolymer or PVC-PVA copolymer extender grade resins are blended with PVC homopolymer or PVC-PVA copolymer dispersion grade resins to reduce the cost of the plastisol. extender grade resins are also used to control viscosity of the plastisol as well as modify other physical properties. A ratio of 60–70 parts by weight of dispersion grade resin to 30–40 parts by weight of extender resin is suggested as the starting ratio in formulating PVC foam compositions.

Individual plasticizers or blends of plasticizers are used in foamable PVC compositions to impart flexibility to the finished foam. Plasticizers affect other physical properties of the foam as well as viscosity stability and low temperature fusing characteristics of the plastisol. Plasticizers are classified as either primary or secondary plasticizers depending on their effects on the resin base. For PVC foam it is important that the plasticizer produce a plastisol with the desired rheological properties. Depending on the density and quality of foam required, the plasticizer level may vary from 40 to 125 phr to vary the plastisol properties. A volatile diluent may be added to form an organosol which can aid in the cellular structure formation. Liquid plasticizers which are well known in the art and which are used in producing mechanically whipped or frothed foams, are classified according to the following combination of chemical composition and end use:

1. Phthalate plasticizers
2. Phosphate plasticizers
3. Low temperature plasticizers
4. High molecular weight plasticizers
5. Miscellaneous plasticizers Phthalate plasticizers are monomeric, general purpose primary plasticizers. They are probably the most widely used group of plasticizers and are used in most applications except in those applications where low temperature or flame resistance properties are required. Useful phthalate plasticizers include di-2-ethylhexyl phthalate, diisooctyl phthalate, dialphanol ($C_7$–$C_9$) phthalate, butylbenzyl phthalate, diisodecyl phthalate, dibutyl phthalate. Phosphate plasticizers are used in applications where flame retardance is important. Useful phosphate plasticizers include tritolyl phosphate, trixylyl phosphate, cresyl diphenyl phosphate, triisopropylated phenol phosphate, tributoxyethyl phosphate. Low temperature plasticizers include sebacates, adipates and azelates. These esters of aliphatic dibasic acids include di-2-ethylhexyl sebacate, di-butoxyethyl adipate, benzyloctyl adipate, dibenzyl sebacate, tetrabutyl thiodisuccinate. Other esters include polyesters such as poly (propylene sebacate), alcohol modified, acid modified, ADMEX 433, DRAPEX 7.7 (Argus Chem.), Elastex 37-R (Allied Chem.) Flexol R2H (Carbide), Kodaflex polyesters (Eastman Kodak), Paraplex G-25 (Rohm & Haas). High molecular weight plasticizers are primarily polymeric materials such as Kodaflex NP-10 (Eastman Chem.), Morflex X-1080 (Chas. Pfizer), Plastolein 3702 (Emery). They are used in foam formulations where high temperature stability and solvent resistance are required. Epoxidized oils, even though they are not polymeric, are included in this group. Useful epoxidized oils include octyl epoxy stearate, epoxidized soybean oil, Harflex 2020 (Harchem), Monoplex S-70 (Rohm & Haas), Nuodex V-50 epoxy tall oil ester. These oils have the high molecular weights required for high temperature stability and have better low temperature properties than polymerics. Miscellaneous plasticizers include chlorinated paraffins, dipropylene glycol dibenzoate, long chain hydrocarbons, ethylene glycol monobutyl ether laurate, tricyclohexyl citrate, diisooctyl mono isodecyl trimellitate. This group also includes plasticizer blends which are prepared for specific applications by combining the properties of several plasticizers.

Non-solvating plasticizers tend to lower viscosity of the plastisol, whereas solving plasticizers lower the fusion temperature of the plastisol. A starting ratio of about 60 parts by weight of a non-solvating plasticizer to about 20 parts by weight of a solvating plasticizer is suggested. The ultimate ratio will depend on the plasticizers selected.

Since the plasticizer is the continuous phase in the plastisol compound, it is of primary concern in the selection of the silicone surfactant frothing agent.

Selection of the silicone surfactant frothing agent depends on the resin as well as the plasticizer in the plastisol. Often efficiency of the silicone surfactant can be improved by using a blend of solvating and non-solvating plasticizers in the plastisol. These frothing agents are well known in the art. Exemplary of the silicone surfactant frothing agents are copolymers prepared by the cohydrolysis of $(CH_3)_3SiX$ and/or $Q(CH_3)_2SiX$ with $SiX_4$, wherein X is a hydrolyzable radical such as a halogen (chlorine, fluorine, bromine) or any alkoxy (methoxy, ethoxy, propoxy, butoxy, etc.) radical, employing, of course, such proportions as are necessary to obtain the desired $SiO_2$ to total $(CH_3)_3Si$ and $Q(CH_3)_2Si$ ratio of 1:0.6 to 1:1.2. Alternatively, copolymers can be prepared, for example, by reacting $(CH_3)_3SiCl, (CH_3)_3SiOC_2H_5$ or $(CH_3)_3SiOSi(CH_3)_3$ with an acidic silica sol. This method is fully described in U.S. Pat. No. 2,676,182, the disclosure of said patent being incorporated herein by reference.

A particularly useful means for preparing modified copolymers containing both $(CH_3)_3SiO_{1/2}$ and $Q(CH_3)_2SiO_{1/2}$ units involves cohydrolyzing a mixture of $(CH_3)_3SiX$ and $H(CH_3)_2SiX$ with $SiX_4$ and then coupling the desired solubilizing group Q to the copolymer by reacting the hydrogen on the silicon atom with the unsaturated group of a compound which also contains the desired solubilizing group. This type of reaction is well known to those skilled in the art. The purpose of the solubilizing group in the radical Q is to make the copolymer compatible with plastisols which it might not be compatible with otherwise. Any solubilizing group can be present in the copolymers of this invention, the particular plastisol in which the copolymer is being used determines the choice of solubilizing group. Examples of solubilizing groups which can be present in the Q radical include carboxyl, ester, amide, amino, mercapto, halohydrocarbon, nitrile, nitro, carbonyl and higher hydrocarbon groups.

The essential characteristics of the silicone surfactants defined above are the siloxane units present in the copolymer surfactant, the ratio of these units and the compatibility of the surfactant with the plastisol. By being "compatible", it is meant that the surfactant is partially soluble and/or dispersible in the plastisol. Compatibility of the surfactant in the plastisol can be controlled in several ways. For example, one can choose a surfactant having the desired compatibility. Compatibility can be controlled by altering the Q radical. Still another alternative is to select a plasticizer for use in the plastisol which gives the desired degree of compatibility. It can be seen from the foregoing illustrations that silicone surfactants provide a maximum amount of flexibility which permits tailoring the surfactants and foamable compositions produced with the surfactants to meet specific specifications rather than vice versa.

The amount of surfactant used need only be sufficient to produce the desired foam density and will vary depending on the application. The amount of surfactant can vary from about 1 to about 5 phr of resin but this amount will depend on the resin and plasticizer selection as well as the desired foam density.

Since PVC polymers change color and harden on prolonged exposure to heat and light, conventional PVC heat and light stabilizers are used in foamable PVC compositions. From about 1 to about 5 phr of one or more of these PVC stabilizers may be added to the PVC foam composition. Chelated and unchelated metallic (barium, calcium, cadmium, zinc, magnesium) soaps and phenates, basic lead carbonate, tribasic lead sulfate, dibasic lead phosphites, organotins, may be used as stabilizers.

Fillers and pigments may also be used in PVC foam compositions. Fillers are used to reduce cost and pigments are used to add color to vinyl plastisol foams. The quantity of fillers may vary from about 10 to about 50 phr. When used, the quantity of pigments may vary from about 1 to about 2 phr.

Useful fillers include the most frequently used natural and precipitated calcium carbonates. Also calcined clays, talcs, barytes, aluminum oxides, calcium silicates, asbestos, diatomaceous earth, water ground mica, carbon and graphite, titanium dioxide may be used. PVC foam for furniture, automobiles, trains, planes, textiles, floorings, and carpet backing may be white, black, or colored. To obtain various colors, pigments such as benzidine yellow, chrome oxide green, Watchung Red (Pigment Red 48), phthalocyanine blue (Pigment Blue 15) may be used.

For the purposes of this invention, the term "frothing agent" is used to describe those silicone surfactants which actually foam the plastisol under mechanical agitation. The term "frothing aid" is used to describe those products which, although not being effective frothing agents by themselves, do increase the frothing activity of the silicone surfactants.

The frothing aid is used to extend the silicone surfactant frothing agent. From about 5.0 phr to about 10 phr of frothing aid is added to the foam composition. Useful oleophilic frothing aids include one or a mixture of the free acids of simple and complex organic phosphate mono and diesters and phosphites; organic nitrogen compounds such as amines, aminoamides, alkanolamides, imidazolines, quaternaries, and nitrogen-sulfur compounds, simple and complex organic borate esters such as 2-ethyl-hexyl borate, tri-hexylene glycol biborate, and tricresyl borates. Phosphate ester surfactants include those described in Krupin, "Phosphate Ester Surfactants — Newer Uses"; Soap & Chemical Specialities, p. 86, May, 1969, which is incorporated by reference herein, may be used.

Examples of frothing aids include:

1. Free acids of simple and complex organic phosphate mono and diesters -

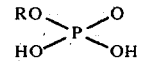 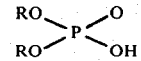

$R = C_8 - C_{20}$, or alkylphenyl or other aromatic. R may be alkoxylated (ethoxy, propoxy, butoxy).

Dicaprylacid phosphate, monolaurylacid phosphate, di (ethoxylated nonyl phenyl) phosphate, dioleyl acid phosphate, distearyl acid phosphate, chlorophenol acid phosphate, fluorocarbon and fluorohydrocarbon acid phosphates (e.g., from pentadecafluorooctyl alcohol).

2. Phosphites — Organic acid phosphites such as didecyl hydrogen phosphite, dilauryl hydrogen phosphite, dioleyl hydrogen phosphite, di (2-ethylhexyl) hydrogen phosphite, diphenyl hydrogen phosphite, dioctadecyl hydrogen phosphite, decylphenyl hydrogen phosphite, lauryl dihydrogen phosphite, pentaerythritol hydrogen phosphite, bisphenol A hydrogen phosphite, thiophenol dihydrogen phosphite, dilauryldithio hyrogen phosphite, dinonylphenyl hydrogen phosphite, diallyl hydrogen phosphite, bromophenol hydrogen phosphite.

3. Amines — Primary, secondary, and tertiary amines. $RNH_2$, $R_2NH$, $R_3N$. R may be aliphatic (saturated or unsaturated), alicyclic, aromatic, or heterocyclic. Caprylamine, laurylamine, stearylamine, oleylamine, dilaurylamine, (cyclohexylmethyl) amine, aniline, 2-ethylhexylamine, t-alkyl primary amines (t-$C_{12}H_{25}NH_2$, t-$C_{22}H_{45}NH_2$), trioctylamine, rosin amine, aminophenol, benzylamine, alkoxylated amines, N-alkyl trimethylene diamines from oleic or adipic acids, hydrogenated tallow amine, di-soya amine, N-coco morpholine, N-lauroyl ethylenediamine, benzylidenecyclohexylamine, N-aliphatic polyamines, perfluorocyclohexyl ($C_6F_{11}$) amines.

4. Aminoamides — Prepared from polyamines (diethylene triamine, triethylene tetramine, tetraethylene pentamine, aminoethylethanolamine) and fatty acids (caprylic, lauric, stearic, behenic, oleic, ricinoleic, linoleic). They may be polyoxyethylated, polypropoxylated, butoxylated.

5. Alkanolamides — These range from amber liquids to waxy solids. They are prepared from mono and dialkanolamines and fatty acids; for example, ethanolamine, diethanolamine, mono and diisopropanolamine, phenyl ethanolamine, tetrahydroxyethyl ethylenediamine, 1-(2-aminoethylamine)-2 propanol condensed in 1:1 ratio and 2:1 ratio alkanolamine to fatty acid or ester (saturated or unsaturated) such as caprylic, lauric, stearic, behenic, oleic, palmitoleic, erucic, eleostearic, linoleic, linolenic, stearolic, ricinoleic, liconic, 2-ethylhexanoic.

6. Imidazolines — Oleic hydroxyethyl imidazoline, tall oil hydroxyethyl imidazoline, coco hydroxyethyl imidazoline, imidazolines from the constituents listed under aminoamides, brominated tall oil hydroxyethyl imidazoline, 1-hydroxyethyl, 2 hepta-decadienyl imidazoline, 2-myristal-1 (ethyl beta oxipropanoic) imidazoline.

7. Quaternaries — Oil Dispersible types. Polyethoxylated (or propolylated) fatty quaternary salts, octyl trimethyl ammonium chloride, dioctadecyl dimethyl ammonium chloride, octadecenyl and octadecadienyl, di and trimethyl ammonium chloride, dicoco dimethyl ammonium chloride, stearyl dimethyl benzyl ammonium chloride, ditallow dimethyl ammonium bromide, ditallow dimethyl ammonium methyl sulfate, dilauryl imidazolinium methosulfate, oleyl pyridinium chloride, hexadecyl trimethyl ammonium stearate.

8. Nitrogen-sulfur compounds — Lubrizol L 40209 (an amine neutralized petroleum sulfonate — 2.8% sulfur, 1.2% nitrogen), Conco AAS Special — triethanolamine neutralized dodecylbenzenesulfonate, benzenedisulfonamide, dialkylaminoalkyl mercaptan $R_2N(CH_2)_nSH$.

9. Simple and complex organic borate esters-2-ethylhexyl borate, trihexylene glycol biborate, tri-m,p-cresyl borate, 2-(beta-dimethylaminoethoxy)-4-methyl-1,3,2-dioxaborinane, tri-n-butyl borate, triisopropanolamine borate, 2,6-di-tert-butyl-4-methylphenyl-di-n-butyl borate, lithium hexylene glycol monoborate, borate of N-hydroxyethyl-N-sec octadecyl piperazine, complexes such as of tetraphenylborate iridium, polymeric borate esters from polyols and boron trihalides, glycerine borate, brominated borate esters, fluorinated borate esters from fluorohydrocarbon alcohols.

The frothing aid may be a mixture of several frothing aids. Useful frothing aid mixtures include a mixture of a free acid of tridecyl alcohol phosphate ester, a trihexyleneglycol biborate, and an alkanolamide of coconut fatty acids and diethanolamine; a mixture of a free acid of an oleyl alcohol ethoxylate phosphate ester, a 2-ethylhexyl borate, and an organic nitrogen-sulfur compound; a mixture of a 2-ethylhexyl borate, a free acid of tridecyl alcohol phosphate ester, and an alkanolamide of coconut fatty acids and diethanolamine; or a mixture of a free acid of tridecyl alcohol phosphate ester, a trihexyleneglycol biborate, and a tertiary ($C_{12}$–$C_{14}$) primary amine.

A simple screening test may be used to determine whether or not a given compound or mixture of compounds will foam a vinyl resin plastisol. If a compound does not foam the plasticizer, it will not foam a plastisol prepared with the plasticizer. Since other plastisol components such as the vinyl resins, other plasticizers, stabilizers, fillers and pigments present in the foam composition will also influence the foaming ability of frothing agents and frothing aids, it is possible that a compound or a mixture of compounds which passes a simple plasticizer foaming screening test (which may be as simple as shaking 2.5 g of potential frothing agent or frothing aid in 50 g of plasticizer for 10 sec in a bottle) may fail in the actual plastisol frothing test. However, this simple plasticizer screening test does not make it possible to discover that certain organic phosphorus, boron, nitrogen compounds and mixtures of these compounds will increase the foaming activity of the silicone frothing agents with the result that less silicone frothing agent is required to produce the same froth and fused foam densities.

The following plastisol formulation may be used to evaluate the frothing aids of this invention:

| | |
|---|---|
| Vinyl resin,dispersion grade | 60.0 parts |
| Fast fusing homopolymer extender PVC resin | 40.0 parts |

-continued

| | |
|---|---|
| No. 10 Whiting | 20.0 parts |
| Plasticizer | 75.0–85.0 parts* |
| Silicone frothing agent | 2.0–4.0 parts |
| Vinyl resin stabilizer | 1.0 parts |
| Frothing aid | 5.0–10.0 parts |

*Normally in this typical carpet backing plastisol for PVC foam production, 85.0 parts of plasticizer is used. However, when a frothing aid is used, the plasticizer content can be reduced by an amount equal to the amount of frothing aid added.

In evaluation of the frothing aid, approximately 624 g of plastisol containing the frothing agent and frothing aid is whipped for 5 minutes using a Model N-50 Hobart Mixer with wire whip, at Speed No. 2 (the most effective speed for lowest density froth and fused foam) to froth the plastisol. Froth density is determined using 9 oz paper cups. A Brookfield Synchro-Lectric Viscometer, Model LVF, Spindle No. 4, Speed 12, is used to measure froth viscosity. The resulting vinyl resin plastisol froths are then fused in aluminum trays at 280°F in a forced air oven for 10 minutes to obtain approximately 6 × 2¾ × ¼ inch PVC fused foams. Foams are weighed and densities calculated. Surface characteristics, cell structure, odor, and color are also noted.

Mixing equipment commonly used to froth or foam vinyl plastisols mechanically include the Oakes foamer (E. T. Oakes Corporation, Islip, New York) and the Texacote foamer (Textile Rubber and Chemical Company, Dalton, Georgia). Foam can be produced continuously by feeding the foam composition into the mixing chamber of the Oakes foamer at a constant rate using a positive displacement variable speed pump. The mixing chamber employs sets of teeth or pins both on the rotating and stationary meshing units. The small clearance between the two units produces a high rate of shear which facilitates dispersion of an air stream into the foam composition.

The resulting foams are heated at about 250° to about 320°F to fuse the foam. Some foams expand during the fusion steps in these tests when frothing aids are used in combination with silicone surfactants. This is an important feature because more foam can be produced from an equal weight of plastisol.

For a fuller understanding of the nature and objects of this invention, reference may be made to the following examples. These examples are given merely to illustrate the invention and are not to be construed in a limiting sense. All parts, proportions and quantities are by weight unless otherwise indicated. The terms g, l, °C, °F, lb, $ft^3$, phr, cps are used to indicate grams, liters, degrees Centigrade, degrees Fahrenheit, pounds, cubic feet, parts per hundred parts resin, centipoises respectively, in these examples.

EXAMPLE I

The various compounds shown in Table I are evaluated as frothing aids to extend the silicone surfactant frothing agent in the following foamable plastisol formulation:

| Component | Concentration phr |
|---|---|
| Vinyl resin,dispersion grade | 60.0 |
| Fast fusing homopolymer extender PVC resin | 40.0 |
| No. 10 Whiting | 20.0 |
| Plasticizer | 75.0–85.0 |
| Silicone frothing agent | 2.0–4.0 |
| Vinyl resin stabilizer | 1.0 |

| Component | Concentration phr |
|---|---|
| Frothing aid | 5.0–10.0 |

The plasticizer is Eastman CB-A (a blend of butyl benzyl phthalate, isobutyrate viscosity depressant and butyl octyl phthalate). Normally in this typical carpet backing plastisol for PVC foam production, 85.0 phr of plasticizer are used. However, when a frothing aid or a mixture of frothing aids is used, the plasticizer content may be reduced by an amount equal to the amount of the frothing aid added. The silicone surfactant frothing agent used in these tests is General Electric SS4255, a 50% solvent solution of silicone surfactant.

The quantities of Phosphorous Compound, Boron Compound and Other Compounds given in Table I are mixed to obtain frothing aid mixtures as clear, stable, viscous liquids. Exothermic reactions may occur when Phosphorous Compounds, e.g., organic phosphate esters are mixed with Nitrogen Compounds and reaction temperatures as high as 85°C may be obtained during mixing. When Boron Compounds, e.g., borate esters are added to these mixtures, the resulting mixtures are heated to 95° to 100°C. All mixtures are heated to 95° to 100°C.

Each frothing aid or frothing aid mixture is evaluated by mechanically whipping approximately 624 g of plastisol containing silicone surfactant and frothing aid for 5 minutes using a Model N-50 Hobart Mixer with wire whip, at Speed No. 2 (the most effective speed for lowest density froth and fused foam). Froth density is measured in a 9 oz paper cup. A Brookfield Synchro-Lectric Viscometer, Model LVF, Spindle No. 4, Speed 12, is used to measure froth viscosity. The resulting foamed vinyl resin plastisol is fused in an aluminum tray at 280°F in a forced air oven for 10 minutes to obtain approximately 6 × 2¾ × ¼ inch sample of PVC fused foam. Each fused foam sample is weighed and its density calculated. Surface characteristics, cell structure, odor, and the color of each foam sample are noted.

Controls used for determining effectiveness of frothing aids are the froth densities and fused foam densities obtained with 4.0, 3.0 and 2.0 phr silicone frothing agent in the plastisol formulation without a frothing aid. Any frothing aid or mixture of frothing aids, which produces lower froth densities and fused foam densities than those obtained with 2.0 phr frothing agent in the controls, is considered to be an improved product of this invention.

TABLE I

MECHANICAL FOAM TESTS WITH PLASTISOL CONTAINING 2.0 phr SILICONE SURFACTANT

| Foam Test Number | phr Frothing Aid | % Phosphorus Compound | % Boron Compound | % Other Compounds | Brookfield Viscosity Froth cps | Froth Density g/l | Fused Foam Density lb/ft³ |
|---|---|---|---|---|---|---|---|
| 1 | 10.0 | 25 CROD. N3 | 50 Q | 25 L40209 | 17250 | 555 | 20.4 |
| 2 | 8.0 | 25 CROD. N3 | 50 Q | 25 L40209 | 14500 | 575 | 22.9 |
| 3 | 10.0 | 25 CROD. N3 | 50 Q | 225 VARIQUAT L200 | 21750 | 580 | 25.2 |
| 4 | 10.0 | 25 RE960 | 25 Q | 50 L40209 | 22500 | 580 | 26.3 |
| 5 | 10.0 | 50 CROD. N3 | 50 Q |  | 21500 | 550 | 26.5 |
| 6 | 8.0 | 50 CROD. N3 | 50 Q |  | 21750 | 550 | 27.1 |
| 7 | 6.0 | 50 CROD. N3 | 50 Q |  | 24750 | 570 | 27.3 |
| 8 | 8.0 | 25 CROD. N3 | 25 Q | 50 L40209 | 17000 | 590 | 27.9 |
| 9 | 10.0 |  | 50 Q | 50 L40209 | 16500 | 575 | 28.2 |
| 10 | 10.0 | 25 ACT. T | 50 Q | 25 L40209 | 23000 | 600 | 28.2 |
| 11 | 6.0 | 25 RE 960 | 25 Q | 50 L40209 | 25500 | 580 | 28.6 |
| 12 | 6.0 | 25 CROD. N3 | 50 Q | 25 L40209 | 15750 | 595 | 28.6 |
| 13 | 4.0 | 50 CROD. N3 |  | 50 L40209 | 24250 | 600 | 28.6 |
| 14 | 8.0 | 25 ACT. T |  | 25 L40209 | 24500 | 615 | 28.6 |
| 15 | 6.0 |  | 50 Q | 100 L40209 | 28000 | 585 | 28.7 |
| 16 | 4.0 | 50 CROD. N3 | 50 Q |  | 24500 | 585 | 28.8 |
| 17 | 4.0 |  | 50 Q | 50 L40209 | 20000 | 610 | 28.9 |
| 18 | 8.0 |  |  | 100 L40209 | 23250 | 585 | 29.0 |
| 19 | 6.0 | 25 ACT. T | 50 Q | 25 L40209 | 24500 | 620 | 29.1 |
| 20 | 8.0 | 25 RE960 | 25 Q | 50 L40209 | 24500 | 575 | 29.4 |
| 21 | 6.0 | 50 CROD. N3 |  | 50 L40209 | 23250 | 600 | 29.4 |
| 22 | 6.0 |  | 50 Q | 50 L40209 | 16500 | 595 | 29.5 |
| 23 | 4.0 | 25 CROD. N3 | 50 Q | 25 L40209 | 18500 | 595 | 29.6 |
| 24 | 8.0 | 50 CROD. N3 |  | 50 L40209 | 23000 | 605 | 29.6 |
| 25 | 10.0 | 50 CROD. N3 |  | 50 L40209 | 26500 | 610 | 29.6 |
| 26 | 4.0 |  |  | 100 L40209 | 26000 | 600 | 29.8 |
| 27 | 6.0 | 25 CROD. N3 | 25 Q | 50 L40209 | 20000 | 595 | 30.0 |
| 28 | 4.0 | 25 CROD. N3 | 25 Q | 50 L40209 | 26000 | 605 | 30.1 |
| 29 | 10.0 |  |  | 100 L40209 | 25000 | 580 | 30.4 |
| 30 | 8.0 |  | 50 Q | 50 L40209 | 16500 | 580 | 30.5 |
| 31 | 8.0 | 25 CROD. N3 | 50 Q | 25 VARIQUAT L200 | 20000 | 600 | 30.6 |
| 32 | 10.0 | 25 CROD. N3 | 25 Q | 50 L40209 | 20750 | 595 | 31.4 |
| 33 | 4.0 | 25 CROD. N3 | 50 Q | 25 VARIQUAT L200 | 26500 | 610 | 31.8 |
| 34 | CONTROL |  |  | 2.0 phr SS 4255 | 23500 | 620 | 32.1 |
| 35 | CONTROL |  |  | 3.0 phr SS 4255 | 15000 | 585 | 27.6 |
| 36 | CONTROL |  |  | 4.0 phr SS 4255 | 18000 | 490 | 25.2 |

EXAMPLE II

The procedure of Example I is repeated with the exceptions that the silicone surfactant frothing agent used in the plastisol formulation is Dow Corning 1250, a 50% xylene solution of silicone surfactant and the plasticzer is butyl ethylhexyl phthalate. Results of these tests are shown in Tables II through VIII inclusive.

TABLE II

MECHANICAL FOAM TESTS WITH PLASTISOL CONTAINING 2.0 phr SILICONE SURFACTANT

| Foam Test Number | phr Frothing Aid | % Nitrogen-Sulfur Compound | % Phosphorus Compound | % Boron Compound | % Nitrogen Compound | Froth Viscosity cps | Froth Density g/l | Fused Foam Density lb/ft³ |
|---|---|---|---|---|---|---|---|---|
| 37 | 10.0 |  | 50 ACT. T | 25 B7 | 25 Z | 19000 | 525 | 22.3 |
| 38 | 10.0 |  | 25 ACT. T 25 W | 25 B7 | 25 81R | 22500 | 510 | 22.9 |
| 39 | 10.0 |  | 50 ACT. T | 25 B7 | 25 Y | 21250 | 510 | 23.3 |
| 40 | 10.0 |  | 37.5 ACT. T | 25 B7 | 37.5 2C | 28000 | 500 | 23.7 |
| 41 | 10.0 | 10 L40209 | 40 ACT. T | 25 B7 | 25 Y | 20000 | 520 | 23.7 |
| 42 | 10.0 |  | 25 ACT. T 25 W | 25 B7 | 25 2C | 20750 | 510 | 24.0 |
| 43 | 7.5 | 10 L40209 | 40 ACT. T | 25 B7 | 25 Y | 20000 | 525 | 24.1 |
| 44 | 10.0 | 25 AAS | 50 ACT. T | 25 B7 |  | 26500 | 535 | 24.2 |
| 45 | 10.0 | 25 L40209 | 50 ACT. T | 25 B7 |  | 25500 | 545 | 24.2 |
| 46 | 10.0 |  | 50 ACT. T | 25 Q | 25 Y | 21010 | 495 | 24.3 |
| 47 | 7.5 |  | 50 ACT. T | 25 Q | 25 Y | 23000 | 500 | 24.3 |
| 48 | 10.0 |  | 25 ACT. T 25 W | 25 B7 | 25 TOA | 24000 | 525 | 24.3 |
| 49 | 5.0 |  | 50 ACT. T | 25 B7 | 25 Y | 22750 | 530 | 24.4 |
| 50 | 7.5 |  | 50 ACT. T | 25 B7 | 25 Z | 20250 | 535 | 24.4 |
| 51 | 10.0 |  | 37.5 ACT. T | 25 B7 | 37.5 2HT | 24750 | 530 | 24.7 |
| 52 | 10.0 |  | 50 ACT. T | 25 B7 | 25 2HT(A) | 25250 | 530 | 24.9 |
| 53 | 10.0 | 12.5 L40209 | 50 ACT. T | 25 B7 | 12.5 RD | 22000 | 535 | 25.0 |
| 54 | 10.0 | 25 L40209 | 50 ACT. T | 25 B7 |  | 23750 | 540 | 25.0 |
| 55 | 10.0 |  | 25 ACT. T 25 W | 25 B7 | 25 JMT | 21000 | 510 | 25.2 |
| 56 | 10.0 | 25 L40209 | 12.5 ACT. T 12.5 RE960 | 50 B7 |  | 18000 | 550 | 25.2 |
| 57 | CONTROL |  | 4.0 phr DOW CORNING 1250 |  |  | 24750 | 480 | 25.5 |

TABLE III

MECHANICAL FOAM TESTS WITH PLASTISOL CONTAINING 2.0 phr SILICONE SURFACTANT

| Foam Test Number | phr Frothing Aid | % Nitrogen-Sulfur Compound | % Phosphorus Compound | % Boron Compound | % Nitrogen Compound | Froth Viscosity cps | Froth Density g/l | Fused Foam Density lb/ft³ |
|---|---|---|---|---|---|---|---|---|
| 58 | 5.0 |  | 50 ACT. T | 25 Q | 25 Y | 123500 | 520 | 25.5 |
| 59 | 5.0 | 25 L40209 | 50 ACT. T | 25 B7 |  | 22000 | 550 | 25.5 |
| 60 | 5.0 | 25 L40209 | 12.5 ACT. T 12.5 RE960 | 50 B7 |  | 22500 | 560 | 25.5 |
| 61 | 5.0 |  | 50 ACT. T | 25 B7 | 25 Z | 23750 | 535 | 25.6 |
| 62 | 7.5 | 25 AAS | 50 ACT. T | 25 B7 |  | 22000 | 550 | 25.6 |
| 63 | 7.5 | 25 L 40209 | 50 ACT. T | 25 B7 |  | 22750 | 545 | 25.7 |
| 64 | 10.0 |  | 50 ACT. T | 12.5 B7 12.5 Q | 25 81R | 20000 | 535 | 25.8 |
| 65 | 10.0 |  | 25 ACT. T | 50 Q | 25 Y | 18750 | 505 | 25.9 |
| 66 | 7.5 | 12.5 L40209 | 50 ACT. T | 25 B7 | 12.5 RD | 22000 | 535 | 25.9 |
| 67 | 10.0 | 10 L40209 | 30 ACT. T | 60 B7 |  | 27000 | 550 | 25.9 |
| 68 | 7.5 |  | 50 ACT. T | 25 B7 | 25 Y | 20500 | 525 | 26.0 |
| 69 | 5.0 | 25 L40209 | 25 RE960 | 50 B7 |  | 21750 | 575 | 26.1 |
| 70 | 10.0 | 25 AAS | 50 ACT. T |  | 25 81R | 24750 | 540 | 26.2 |
| 71 | 7.5 |  | 50 ACT. T | 25 B7 | 25 X | 21000 | 535 | 26.2 |
| 72 | 5.0 |  | 37.5 ACT. T | 25 B7 | 37.5 2C | 25500 | 545 | 26.3 |
| 73 | 10.0 |  | 37.5 ACT. T | 25 B7 | 37.5 DMCD | 22500 | 520 | 26.3 |
| 74 | 5.0 | 25 L40209 | 25 ACT. T | 50 B7 |  | 22250 | 550 | 26.3 |
| 75 | 10.0 |  | 50 ACT. T | 12.5 B7 | 37.5 TOA | 22500 | 535 | 26.4 |
| 76 | 10.0 | 10 L40209 | 25 ACT. T | 25 B7 | 40 81R | 20000 | 535 | 26.4 |

TABLE IV

MECHANICAL FOAM TESTS WITH PLASTISOL CONTAINING 2.0 phr SILICONE SURFACTANT

| Froth Test Number | phr Frothing Aid | % Nitrogen-Sulphur Compound | % Phosphorus Compound | % Boron Compound | % Nitrogen Compound | Froth Viscosity cps | Froth Density g/l | Fused Foam Density lb/ft³ |
|---|---|---|---|---|---|---|---|---|
| 77 | 7.5 |  | 550 ACT. T | 25 B7 | 25 VO | 19500 | 550 | 26.5 |
| 78 | 7.5 |  | 50 ACT. T | 25 B1 | 25 K202P | 25750 | 525 | 26.6 |
| 79 | 10.0 |  | 50 ACT. T | 25 B7 | 25 X | 20750 | 525 | 26.6 |
| 80 | 7.5 |  | 50 ACT. T | 25 B7 | 12.5 RD 12.5 81R | 23500 | 540 | 26.6 |
| 81 | 10.0 |  | 50 ACT. T | 25 B7 | 12.5 RD 12.5 81R | 24000 | 540 | 26.6 |
| 82 | 7.5 | 25 AAS | 50 ACT. T |  | 25 81R | 23750 | 550 | 26.6 |
| 83 | 7.5 |  | 50 ACT. T | 25 B7 | 25 Y | 20000 | 530 | 26.7 |
| 84 | 10.0 |  | 25 ACT. T 25 W | 50 B7 |  | 16000 | 540 | 26.7 |
| 85 | 7.5 | 10 L40209 | 25 ACT. T | 25 B7 | 40 81R | 20000 | 540 | 26.7 |
| 86 | 10.0 | 25 L40209 | 12.5 ACT. T 12.5 W |  | 50 2C | 19000 | 545 | 26.7 |

TABLE IV-continued

MECHANICAL FOAM TESTS WITH PLASTISOL CONTAINING 2.0 phr SILICONE SURFACTANT

| Froth Test Number | phr Frothing Aid | Frothing Aid Composition | | | | Froth Viscosity cps | Froth Density g/l | Fused Foam Density lb/ft³ |
|---|---|---|---|---|---|---|---|---|
| | | % Nitrogen-Sulphur Compound | % Phosphorus Compound | % Boron Compound | % Nitrogen Compound | | | |
| 87 | 10.0 | | 50 ACT. | 25 B7 | 25 VT | 19950 | 530 | 26.8 |
| 88 | 10.0 | 25 L40209 | 25 ACT. T | 50 B7 | | 18250 | 545 | 26.8 |
| 89 | 10.0 | | 25 ACT. T 25 W | | 50 2S | 18000 | 550 | 26.8 |
| 90 | 5.0 | | 25 ACT. T 25 W | 50 B7 | | 18350 | 555 | 26.8 |
| 91 | 7.5 | 50 AAS | | 25 B7 | 25 81R | 17000 | 595 | 26.8 |
| 92 | 5.0 | | 37.5 ACT. T | 25 B7 | 37.5 2HT | 22500 | 550 | 26.9 |
| 93 | 10.0 | | 50 ACT. T | 25 B7 | 25 Z-1 | 21250 | 530 | 27.0 |
| 94 | 5.0 | | 50 ACT. T | 25 B7 | 25 Z-1 | 23500 | 540 | 27.0 |
| 95 | 5.0 | | 25 ACT. T | 50 Q | 25 Y | 19000 | 540 | 27.1 |
| 96 | 10.0 | | 37.5 ACT. T | 25 B7 | 37.5 B100 | 27250 | 550 | 27.1 |

TABLE V

MECHANICAL FOAM TESTS WITH PLASTISOL CONTAINING 2.0 phr SILICONE SURFACTANT

| Foam Test Number | phr Frothing Aid | Frothing Aid Composition | | | | Froth Viscosity cps | Froth Density g/l | Fused Foam Density lb/ft³ |
|---|---|---|---|---|---|---|---|---|
| | | % Nitrogen-Sulfur Compound | % Phosphorus Compound | % Boron Compound | % Nitrogen Compound | | | |
| 97 | 10.0 | | 50 ACT. T | 25 B7 | 25 K202P | 23000 | 525 | 27.3 |
| 98 | 5.0 | 12.5 L40209 | 50 ACT. T | 25 B7 | 12.5 RD | 24000 | 550 | 27.5 |
| 99 | 5.0 | | 50 DPP | 50 B7 | | 24250 | 570 | 27.6 |
| 100 | 10.0 | 10 L40209 | 25 ACT. T | 50 B7 | 15 81R | 20500 | 540 | 27.8 |
| 101 | 5.0 | 25 L40209 | 50 ACT. T | 25 B7 | | 17500 | 550 | 27.8 |
| 102 | 5.0 | | 50 ACT. T | 25 B7 | 25 VO | 23000 | 560 | 27.8 |
| 103 | 7.5 | 10 L40209 | 30 ACT. T | 60 B7 | | 25000 | 580 | 27.8 |
| 104 | 10.0 | | 37.5 ACT. T | 25 B7 | 37.5 DMHTD | 24250 | 535 | 27.9 |
| 105 | 7.5 | | 50 ACT. T | 12.5 B7 12.5 Q | 25 81R | 19500 | 540 | 27.9 |
| 106 | 5.0 | 10 L40209 | 25 ACT. T | 25 B7 | 40 81R | 22750 | 550 | 27.9 |
| 107 | 5.0 | | 37.5 ACT. T | 25 B7 | 37.5 DMHTD | 22750 | 560 | 27.9 |
| 108 | 5.0 | 25 L40209 | 12.5 ACT. T 12.5 W | | 50 2C | 17000 | 560 | 28.2 |
| 109 | 5.0 | | 25 ACT. T 25 W | 25 B7 | 25 2C | 16000 | 545 | 28.3 |
| 110 | 10.0 | 25 L40209 | 12.5 RE960 12.5 W | 50 B7 | | 22250 | 560 | 28.2 |
| 111 | 5.0 | 25 AAS | 50 ACT. T | | 25 81R | 27500 | 560 | 28.3 |
| 112 | 10.0 | | | 50 B7 | 50 C | 14000 | 570 | 28.3 |

TABLE VI

MECHANICAL FOAM TESTS WITH PLASTISOL CONTAINING 2.0 phr SILICONE SURFACTANT

| Foam Test Number | phr Frothing Aid | Frothing Aid Composition | | | | Froth Viscosity cps | Froth Density g/l | Fused Foam Density lb/ft³ |
|---|---|---|---|---|---|---|---|---|
| | | % Nitrogen-Sulfur Compound | % Phosphorus Compound | % Boron Compound | % Nitrogen Compound | | | |
| 113 | 7.5 | | 50 ACT. T | 25 B7 | 25 RD | 23250 | 570 | 28.4 |
| 114 | 10.0 | 25 L40209 | 12.5 RE960 12.5 CROD. N3 | 50 B7 | | 20000 | 590 | 28.4 |
| 115 | 5.0 | | 25 ACT. T 25 W | 25 B7 | 25 TBA | 22750 | 580 | 28.5 |
| 116 | 10.0 | | 50 ACT. T | 25 B7 | 25 VO | 19250 | 535 | 28.6 |
| 117 | 7.5 | 10 L40209 | 25 ACT. T | 50 B7 | 15 81R | 18000 | 545 | 28.6 |
| 118 | 5.0 | | | 50 B7 | 50 C | 16500 | 575 | 28.6 |
| 119 | 5.0 | 25 L40209 | 12.5 RE960 12.5 CROD. N3 | 50 B7 | | 24000 | 580 | 28.6 |
| 120 | 10.0 | 25 L40209 | 12.5 ACT. T 12.5 W | | 50S | 21000 | 580 | 28.6 |
| 121 | 10.0 | 50 AAS | | 25 B7 | 25 81R | 19000 | 595 | 28.6 |
| 122 | 10.0 | 25 L40209 | 25 ACT. T | | 50 2C | 22750 | 525 | 28.7 |
| 123 | 7.5 | | 50 ACT. T | 25 B7 | 25 VT | 21000 | 535 | 28.7 |
| 124 | 5.0 | | 25 ACT. T 25 W | 25 B7 | 25 TOA | 25250 | 550 | 28.9 |
| 125 | 5.0 | | 50 ACT. T | 25 B7 | 25 K202P | 21000 | 550 | 28.9 |
| 126 | 10.0 | | 50 DPP | 50 B7 | | 23500 | 555 | 29.0 |

TABLE VII

MECHANICAL FOAM TESTS WITH PLASTISOL CONTAINING 2.0 phr SILICONE SURFACTANT

Frothing Aid Composition

| Foam Test Number | phr Frothing Aid | % Nitrogen-Sulfur Compound | % Phosphorus Compound | % Boron Compound | % Nitrogen Compound | Froth Viscosity cps | Froth Density g/l | Fused Foam Density lb/ft$^3$ |
|---|---|---|---|---|---|---|---|---|
| 127 | 5.0 | 10 L40209 | 30 ACT. T | 60 B7 | | 22250 | 580 | 29.0 |
| 128 | 5.0 | | 25 ACT. T 25 W | 25 B7 | 25 JMT | 18500 | 550 | 29.1 |
| 129 | 5.0 | | 50 ACT. T | 25 B7 | 25 VT | 24000 | 550 | 29.1 |
| 130 | 10.0 | | 25 DPP | 50 B7 | 25 C | 17500 | 575 | 29.2 |
| 131 | 10.0 | 25 L40209 | 25 RE960 | 50 B7 | | 18750 | 580 | 29.2 |
| 132 | 10.0 | | ACT. T 25 W | 25 B7 | 25 TBA | 24000 | 595 | 29.3 |
| 133 | 7.5 | 10 L40209 | 30 Z-2 | 60 B7 | | 21100 | 600 | 29.3 |
| 134 | 5.0 | | 50 ACT. T | 12.5 B7 12.5 Q | 25 81R | 22500 | 550 | 29.4 |
| 135 | 10.0 | 10 L40209 | 30 Z-2 | 60 87 | | 19250 | 595 | 29.4 |
| 136 | 5.0 | 25 L40209 | 25 ACT. T | | 50 2HT(A) | 17500 | 580 | 29.6 |
| 137 | 10.0 | 25 L40209 | 25 CROD. N3 | 50 B7 | | 21500 | 580 | 29.6 |
| 138 | 5.0 | | 50 ACT. T | 25 B7 | 25 2HT (A) | 18500 | 565 | 29.7 |
| 139 | 5.0 | 25 DPP | 50 B7 | 25 C | 18500 | 585 | 29.8 | |
| 140 | | CONTROL 3.0 phr DOW CORNING 1250 SILICONE | | | | 21000 | 600 | 29.7 |

TABLE VIII

MECHANICAL FOAM TESTS WITH PLASTISOL CONTAINING 2.0 phr SILICONE SURFACTANT

Frothing Aid Composition

| Foam Test Number | phr Frothing Aid | % Nitrogen-Sulfur Compound | % Phosphorus Compound | % Boron Compound | % Nitrogen Compound | Froth Viscosity cps | Froth Density g/l | Fused Foam Density lb/ft$^3$ |
|---|---|---|---|---|---|---|---|---|
| 141 | 10.0 | 10 L40209 | 30 CROD. N3 | 60 B7 | | 18500 | 600 | 29.8 |
| 142 | 5.0 | | 37.5 ACT. T | 25 B7 | 37.5 B100 | 23000 | 575 | 30.1 |
| 143 | 7.5 | 10 L40209 | 30 CROD. N3 | 60 B7 | | 20000 | 590 | 30.1 |
| 144 | 5.0 | | 50 ACT. T | 12.5 B7 | 37.5 TOA | 25500 | 545 | 30.2 |
| 145 | 5.0 | 50 AAS | | 25 B7 | 25 81R | 20000 | 590 | 30.2 |
| 146 | 10.0 | 25 L40209 | 25 DPP | 50 B7 | | 13000 | 580 | 30.4 |
| 147 | 5.0 | 25 L40209 | 12.5 RE960 12.5 W | 50 B7 | | 22000 | 565 | 30.5 |
| 148 | 10.0 | | 50 ACT. T | 25 B7 | 25 RD | 22500 | 565 | 30.5 |
| 149 | 10.0 | 25 L40209 | 25 ACT. T | | 50 2HT(A) | 15000 | 590 | 30.5 |
| 150 | 5.0 | 25 L40209 | 25 ACT. T | | 50 2C | 19250 | 540 | 30.6 |
| 151 | 5.0 | 10 L40209 | 30 CROD. N3 | 60 B7 | | 21500 | 595 | 30.6 |
| 152 | 5.0 | 25 L40209 | 25 DPP | 50 B7 | | 18000 | 600 | 30.7 |
| 153 | 5.0 | | 25 ACT. T 25 W | 25 B7 | 25 81R | 21000 | 535 | 30.8 |
| 154 | | CONTROL 2.0 phr DOW CORNING 1250 SURFACTANT | | | | 22000 | 580 | 30.8 |

KEY TO TABLES I THROUGH VIII

| | |
|---|---|
| ACT. T. | Arthur C. Trask Co. ACTROFOS T, acid form tridecyl alcohol phosphate ester. |
| AAS | Continental Chem. CONCO AAS Special. Triethanelamine Neut. dodecylbenzene sulfonate. |
| B7 | U.S. Borax BORESTER 7, trihexyleneglycol biborate. |
| B100 | Armour ARQUAD B100, 50% soln. coco dimethyl benzyl ammonium chloride. |
| C | Armour ARMEEN C- cocoamine. |
| 2C | Armour ARMEEN 2C, dicocoamine. |
| CROD. N3 | Croda Inc. CRODAFOS N3, acid form phosphated oleyl ether. |
| DMCD | Armour ARMEEN DMCD, lauryl-myristyl tert. amine. |
| DMHTD | Armour ARMEEN DMHTD, palmityl-stearyl tert. amine. |
| DC 1250 | Dow Corning 1250 Silicone Surfactant - Dow Corning. |
| DPP | EASTMAN diphenyl phosphite. |
| 2HT | Armour ARQUAD 2HT, 75% di(hexadecyl-octadecyl) quaternary ammonium chloride. |
| 2HT (A) | Armour ARMEEN 2HT, di(hydrogenated tallow) amine. |
| JMT | Rohm and Haas PRIMENE JM-T, tert. ($C_{18}$–$C_{22}$) primary amine. |
| K202P | Varney Chem. VARONIC K202P, propoxylated cocoamine. |
| L 40209 | Lubrizol Corp. experimental organic nitrogen-sulphur compound. |
| Q | 2-ethylhexyl borate. |
| RD | Hercules ROSIN AMINE D. |
| RE960 | GAF GAFAC RE960, acid organic phosphate. |
| 81R | Rohm and Haas PRIMENE 81R, tert. ($C_{12}$–$C_{14}$) primary amine. |
| S | Armour ARMEEN S, soyamine. |
| 2S | Armour ARMEEN 2S, disoyamine. |
| SS4255 | 50% solvent solution of silicone surfactant - General Electric. |
| TBA | Rohm and Haas tert. butyl primary amine. |
| TOA | Rohm and Haas tert. octyl primary amine. |
| VARIQUAT L200 | Soya trimethyl ammonium chloride - Northern Petro Chemical. |
| VO | Varney Chem. VARINE O, oleic imidazoline. |
| VT | Varney Chem. VARINE T, tall oil imidazoline. |

KEY TO TABLES I THROUGH VIII -continued

| | |
|---|---|
| W | Free acid phosphate ester of $C_{8-10}$ alcohols. |
| X | Oleic imidazoline. |
| Y | Alkanolamide of coconut oil and diethanolamine. |
| Z | Aminoamide of oleic acid and aminoethylethanolamine. |
| Z-1 | Alkanolamide of coconut oil fatty acids and diethanolamine. |
| Z-2 | Free acid phosphate ester of polyoxypropylene derivative of propylene glycol. |

EXAMPLE III

The procedure of Example II is repeated using 2.0 phr of Dow Corning 1250 as the frothing agent and the quantities of the frothing aid shown in the table below. The chemical nature of the components employed in these formulations are described in the Key to Tables I through VIII.

| Test Formulation Contains | Froth Viscosity cps | Froth Density g/l | Fused Foam Density lb/ft³ |
|---|---|---|---|
| 2.0 phr Dow Corning 1250 plus | | | |
| 5.0 phr Frothing aid Y | 29,500 | 545 | 26.4 |
| 7.5 phr Frothing aid Y | 28,000 | 540 | 25.9 |
| 10.0 phr Frothing aid Y | 27,500 | 540 | 27.9 |
| 2.0 phr Dow Corning 1250 plus | | | |
| 5.0 phr Frothing aid B7 | 19,750 | 540 | 29.2 |
| 7.5 phr Frothing aid B7 | 16,500 | 550 | 27.2 |
| 10.0 phr Frothing aid B7 | 16,500 | 550 | 27.8 |
| 2.0 phr Dow Corning 1250 plus | | | |
| 5.0 phr Frothing aid ACT. T | 28,000 | 520 | 25.3 |
| 7.5 phr Frothing aid ACT. T | 28,000 | 520 | 24.0 |
| 10.0 phr Frothing aid ACT. T | 26,250 | 520 | 24.0 |

EXAMPLE IV

This example describes use of the Oakes continuous mixer to produce foams from PVC foam compositions. Five gallon samples of the test formulations given in the table below are prepared using a Cowles Dissolver. Test Formulations No. 1 and No. 2 are control formulations which do not contain a frothing aid, whereas Test Formulations No. 3 and No. 4 contain Frothing Aid No. 65B and Frothing Aid No. 83A, respectively. The composition of Frothing Aid No. 65B is 50% Q
25% Lubrizol 40209
25% Crodafos N-3 and the composition of Frothing Aid No. 83A is

25% Borester 7
25% Actrafos T
25% W
25% Primene 81-R.

The chemical nature of the components employed in these formulations are described in the Key to Tables I through VIII.

Each test formulation is fed into the Oakes Foamer until the minimum density froth without "blowby" is obtained. Blowby is defined as the inability of the Oakes Mixer to incorporate in the foam the volume of air being supplied to the mixer. Blowby manifests itself by pock marks in the surface of the foam as it exits from the nozzle or by spurting of foam from the nozzle. The froth is fed onto a moving fiber belt with a doctor blade to form ¼ inch height pads. The froth pads are fused in an oven at 275°–280°F for 5 minutes.

TEST FORMULATIONS

| Test Formulation | No. 1 | No. 2 | No. 3 | No. 4 |
|---|---|---|---|---|
| Polyvinyl chloride copolymer dispersion resin | 60 | 60 | 60 | 60 |
| Intermediate molecular weight polyvinyl chloride homopolymer extender resin | 40 | 40 | 40 | 40 |
| Butyl ethylhexyl phthalate | 85 | 85 | 75 | 75 |
| No. 10 Whiting | 20 | 20 | 20 | 20 |
| PVC stabilizer | 1 | 1 | 1 | 1 |
| Silicone frothing agent | 2 | 4 | 2 | 2 |
| Frothing aid 65B | — | — | 10 | — |
| Frothing aid 83A | — | — | — | 10 |
| FROTH DENSITY (g/6 oz cup) | — | 79.8 | 71.6 | 78.8 |
| FOAM DENSITY (lb/ft³) | — | 20.7 | 20.7 | 20.5 |

Test Formulation No. 1 is not satisfactory because excessive "blowby" cannot be eliminated by adjusting Oakes Foamer air flow, rotor speeds and pump feed rate. Test Formulations No. 2, No. 3 and No. 4 produce satisfactory foams in the Oakes Foamer.

While the invention has been described with reference to certain specific embodiments thereof, it is understood that it is not to be so limited since alterations and changes may be made therein which are within the full and intended scope of the appended claims.

What is claimed is:

1. A composition for producing a foam by mechanically whipping comprising:
   a. a plastisol which is a mixture of
      1. a particulate resin selected from the group consisting of a vinyl chloride homopolymer and a resinous copolymer of a major portion of said vinyl chloride and a minor portion of a copolymerizable monomer, and
      2. a high boiling organic liquid plasticizer which is substantially a non-solvent for said particulate resin at room temperature but is capable of dissolving said particulate resin at elevated temperature to form a single phase material which upon cooling to room temperature is a solid material,
   b. from about 1 to about 5 phr of a silicone frothing agent, and c. from about 5 to about 10 phr of an oleophilic frothing aid selected from at least one member of the group consisting of a free acid of a phosphate ester, a free acid of a phosphite ester, a borate ester, an organic nitrogen compound which is selected from the group consisting of amine, aminoamide, alkanolamide, imidazoline and quaternary and organic nitrogen-sulfur compound which is selected from the group consisting of an amine salt of a sulfonic acid, an aromatic sulfonamide and an aminomercaptan wherein the ester moiety is alkyl, alkenyl, aryl, substituted alkyl, substituted alkenyl, substituted aryl or an alkoxylate thereof.

2. The composition of claim 1 wherein the silicone frothing agent is a copolymer of $SiO_2$ units and units selected from the group consisting of $(CH_3)_3SiO_{1/2}$ and $Q(CH_3)_2SiO_{1/2}$ units, wherein Q is a radical containing a solubilizing group that makes the copolymer compatible with said plastisol and the ratio of $SiO_2$ units to the total $(CH_3)_3Si$ and $Q(CH_3)_2Si$ units is in the range of 1:0.6 to 1:1.2.

3. The composition of claim 1 wherein the resin is selected from the group consisting of
   1. homopolymers of vinyl chloride, and
   2. copolymers of vinyl chloride containing in an amount up to about 40% by weight of said copolymer of at least one ethylenically unsaturated monomer copolymerizable therewith selected from the group consisting of vinyl acetate, vinylidene chloride, esters of acrylic acid, vinyl ethers, esters of maleic acid, esters of maleic acid, esters of fumaric acid, acrylonitrile, ethylene and propylene.

4. The composition of claim 1 wherein the frothing aid is a phosphate ester.

5. The composition of claim 1 wherein the frothing aid is a borate ester.

6. The composition of claim 1 wherein the frothing aid is an alkanolamide.

7. The composition of claim 1 wherein the frothing aid is an aminoamide.

8. The composition of claim 1 wherein the frothing aid is an imidazoline.

9. The composition of claim 1 wherein the frothing aid is a mixture of
   a. a free acid of tridecyl alcohol phosphate ester,
   b. a trihexyleneglycol biborate, and
   c. an alkanolamide of coconut fatty acids and diethanolamine.

10. The composition of claim 1 wherein the frothing aid is a mixture of
    a. a free acid of an oleyl alcohol ethoxylate phosphate ester,
    b. a 2-ethylhexyl borate, and
    c. an organic nitrogen-sulfur compound.

11. The composition of claim 1 wherein the frothing aid is a mixture of
    a. a 2-ethylhexyl borate,
    b. a free acid of tridecyl alcohol phosphate ester, and
    c. an alkanolamide of coconut fatty acids and diethanolamine.

12. The composition of claim 1 wherein the frothing aid is a mixture of
    a. a free acid of tridecyl alcohol phosphate ester,
    b. a trihexyleneglycol biborate, and
    c. a tertiary ($C_{12}$–$C_{14}$) primary amine.

13. A process for producing a foam which comprises mechanically whipping the composition of claim 1 to obtain a froth and then heating the froth to obtain a fused, open-celled foamed composition.

14. A substrate coated with the cured, open-celled, foamed composition produced by the process of claim 13.

* * * * *

UNITED STATES PATENT AND TRADEMARK OFFICE
CERTIFICATE OF CORRECTION

PATENT NO. : 3,970,620

DATED : July 20, 1976

INVENTOR(S) : Frederick J. Ihde, Jr.

It is certified that error appears in the above–identified patent and that said Letters Patent are hereby corrected as shown below:

First page, second column in lines 12 and 13 of the Abstract, "nirogen" should be --nitrogen--. Column 3, line, 15, "extender" should be --Extender--. Column 4, line 20, "solving", should be --solvating--. Table I, Columns 9 and 10, in Foam Test Number 3, under heading, "% Other Compounds", "225" should be --25--. Table III, Columns 11 and 12, in Foam Test Number 72, under heading, "Fused Foam Density lb/ft$^3$", "26.3" should be --26.2--. Table IV, Columns 11 and 12, in Foam Test Number 78, under heading, "% Boron Compound", "25B1" should be --25B7--. Table IV, Columns 13 and 14, in Foam Test Number 87, under heading, "% Phosphorus Compound", "50 ACT" should be --50 ACT.T--. Table VII, Columns 15 and 16, in Foam Test No. 135, under heading, "% Boron Compound", "6087" should be --60B7--. Key to Tables I through VIII, Columns 15 and 16, line 3 of the key, "Triethanelamine" should be --Triethanolamine--.

Signed and Sealed this

Sixteenth Day of December 1980

[SEAL]

Attest:

SIDNEY A. DIAMOND

Attesting Officer

Commissioner of Patents and Trademarks